(12) United States Patent
Losh et al.

(10) Patent No.: US 12,420,636 B2
(45) Date of Patent: Sep. 23, 2025

(54) AUTONOMOUS VEHICLE INTERACTION WITH PHYSICAL ENVIRONMENT

(71) Applicant: GM Global Technology Operations LLC, Detroit, MI (US)

(72) Inventors: Michael Alan Losh, Rochester Hills, MI (US); Manoj Sharma, Troy, MI (US); Donald K. Grimm, Utica, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 336 days.

(21) Appl. No.: 18/183,319

(22) Filed: Mar. 14, 2023

(65) Prior Publication Data

US 2024/0308336 A1 Sep. 19, 2024

(51) Int. Cl.
*B60K 35/22* (2024.01)
*G05D 1/00* (2024.01)
(Continued)

(52) U.S. Cl.
CPC ............ *B60K 35/22* (2024.01); *G05D 1/0038* (2013.01); *B60K 35/26* (2024.01); *B60K 35/28* (2024.01);
(Continued)

(58) Field of Classification Search
CPC ........ B60K 2360/165; B60K 2360/175; B60K 2360/334; B60K 2360/573;
(Continued)

(56) References Cited

U.S. PATENT DOCUMENTS 6,810,321 B1 10/2004 Cook
7,286,296 B2 10/2007 Chaves et al.
(Continued)

FOREIGN PATENT DOCUMENTS

DE 102017130623 A1 6/2018
DE 102017004859 B4 3/2019
(Continued)

OTHER PUBLICATIONS

U.S. Appl. No. 17/749,464 to Seder et al., filed May 20, 2022.

*Primary Examiner* — Charles J Han
(74) *Attorney, Agent, or Firm* — Vivacqua Crane, PLLC

(57) ABSTRACT

A system for facilitating interaction between an autonomous vehicle and an external interface in proximity to the autonomous vehicle including a plurality of external sensors positioned on the autonomous vehicle and adapted to collect data relative to an environment surrounding and in proximity to the autonomous vehicle, a controller having a wireless communication module, the wireless communication module adapted to facilitate wireless data exchange between the controller and remote entities, the controller adapted to receive data collected from the plurality of external sensors and identify an interaction mode for the external interface, a microphone and a speaker adapted to facilitate audible communication between the controller and the external interface, and a video display adapted to display visual information to the external interface, wherein the controller is adapted to perform an interaction with the external interface.

16 Claims, 4 Drawing Sheets

(51) Int. Cl.
  *B60K 35/26* (2024.01)
  *B60K 35/28* (2024.01)
  *B60K 35/80* (2024.01)
  *B60K 35/85* (2024.01)

(52) U.S. Cl.
  CPC .............. *B60K 35/80* (2024.01); *B60K 35/85* (2024.01); *B60K 2360/175* (2024.01); *B60K 2360/573* (2024.01); *B60K 2360/589* (2024.01)

(58) Field of Classification Search
  CPC ........ B60K 2360/589; B60K 2360/785; B60K 35/00; B60K 35/22; B60K 35/26; B60K 35/28; B60K 35/80; B60K 35/85; B60R 1/001; B60R 16/023; G05D 1/0038
  See application file for complete search history.

(56) References Cited

U.S. PATENT DOCUMENTS

| | | | |
|---|---|---|---|
| 9,965,950 | B2 | 5/2018 | Xu et al. |
| 11,862,013 | B2 | 1/2024 | Grimm et al. |
| 12,198,546 | B1 | 1/2025 | Cheng et al. |
| 2005/0065711 | A1 | 3/2005 | Dahlgren et al. |
| 2005/0086032 | A1 | 4/2005 | Benitez et al. |
| 2007/0208492 | A1 | 9/2007 | Downs et al. |
| 2007/0208494 | A1 | 9/2007 | Chapman et al. |
| 2010/0253918 | A1 | 10/2010 | Seder et al. |
| 2010/0274473 | A1 | 10/2010 | Konishi |
| 2012/0150425 | A1 | 6/2012 | Chapman et al. |
| 2015/0262477 | A1 | 9/2015 | Fowe et al. |
| 2015/0321606 | A1 | 11/2015 | Vartanian et al. |
| 2016/0071411 | A1 | 3/2016 | Stenneth |
| 2016/0104377 | A1 | 4/2016 | French et al. |
| 2016/0111002 | A1 | 4/2016 | Moise et al. |
| 2017/0184409 | A1 | 6/2017 | Glasgow et al. |
| 2017/0212633 | A1 | 7/2017 | You et al. |
| 2017/0352262 | A1 | 12/2017 | Xu et al. |
| 2019/0272749 | A1* | 9/2019 | Saito .................... G02B 27/01 |
| 2020/0090503 | A1 | 3/2020 | Rolf et al. |
| 2020/0238999 | A1 | 7/2020 | Batts et al. |
| 2020/0242935 | A1 | 7/2020 | Nagata et al. |
| 2020/0254877 | A1 | 8/2020 | Nakajima et al. |
| 2021/0191132 | A1 | 6/2021 | Karner et al. |
| 2021/0360211 | A1 | 11/2021 | Kawamura |
| 2021/0375128 | A1 | 12/2021 | Hahn et al. |
| 2022/0092970 | A1 | 3/2022 | Radakovic et al. |
| 2022/0148416 | A1 | 5/2022 | Eldessouki |
| 2022/0317443 | A1 | 10/2022 | Matsui et al. |
| 2022/0366782 | A1 | 11/2022 | Grimm et al. |
| 2023/0067464 | A1 | 3/2023 | Jonietz et al. |
| 2023/0135641 | A1 | 5/2023 | Miyake et al. |
| 2023/0206753 | A1 | 6/2023 | Xu et al. |
| 2023/0294634 | A1* | 9/2023 | Tam .................... B60R 25/01 |
| 2025/0061802 | A1 | 2/2025 | Zhang et al. |

FOREIGN PATENT DOCUMENTS

| | | |
|---|---|---|
| DE | 102020124666 A1 | 3/2021 |
| DE | 102021117850 A1 | 1/2022 |
| WO | 2013088510 A1 | 6/2013 |

* cited by examiner

AUTONOMOUS VEHICLE INTERACTION WITH PHYSICAL ENVIRONMENT

INTRODUCTION

The present disclosure relates to enabling an autonomous vehicle to interact with people and human machine interfaces within the physical environment surrounding the autonomous vehicle. More specifically, the present disclosure provides a system and method for enabling an autonomous vehicle to recognize an external interface, identify an appropriate interaction mode and to perform an appropriate interaction with the external interface.

Current vehicles include some capability to allow an autonomous vehicle to interact with a physical environment, such as allowing an owner of an autonomous vehicle to remotely trigger the opening of a door to the vehicle. As autonomous vehicle become more prevalent, to fully utilize an autonomous vehicle, the autonomous vehicle will need to be able to automatically or through telepresence, perform interactions with an external interface, such as, but not limited to, providing authorization credentials at a security gate, interacting with a law enforcement officer, picking up packages or food and providing payment for such packages or food.

Thus, while current systems and methods achieve their intended purpose, there is a need for a new and improved system and method for enabling interaction between an autonomous vehicle and an external interface.

SUMMARY

According to several aspects of the present disclosure, a system for facilitating interaction between an autonomous vehicle and an external interface in proximity to the autonomous vehicle, includes a plurality of external sensors positioned on the autonomous vehicle and adapted to collect data relative to an environment surrounding and in proximity to the autonomous vehicle, a controller having a wireless communication module, the wireless communication module adapted to facilitate wireless data exchange between the controller and remote entities, the controller adapted to receive data collected from the plurality of external sensors and identify an interaction mode for the external interface, a microphone and a speaker adapted to facilitate audible communication between the controller and the external interface, and a video display adapted to display visual information to the external interface, wherein, the controller is adapted to perform an interaction with the external interface.

According to another aspect, the interaction performed by the controller is fully automatic.

According to another aspect, the controller is further adapted to initiate a telepresence mode when one of an interaction mode cannot be identified, and an identified interaction mode requires telepresence.

According to another aspect, when in telepresence mode the controller is adapted to facilitate communication between one of a remotely located owner of the autonomous vehicle, a remotely located agent acting on behalf of the owner of the autonomous vehicle, and an artificial intelligence agent, and display, with the video display, one of a video image of the remotely located owner, a video image of the remotely located agent, and a video image of an avatar, and enable a remotely located person to trigger a vehicle event.

According to another aspect, the external interface is one on a person and a human machine interface.

According to another aspect, the video display is adapted to present a visual display within a window of the autonomous vehicle that is visible to the external interface and to occupants within the autonomous vehicle.

According to another aspect, the video display includes a transparent substrate, having light emitting particles dispersed therein, positioned on the window of the autonomous vehicle, a primary graphic projection device for generating a first set of images upon the window based on visible light, a secondary graphic projection device for generating a second set of images upon a secondary area the window of the vehicle based on an excitation light, a primary graphics processing unit in electronic communication with the primary graphic projection device and the controller, and a secondary graphics processing unit in electronic communication with the secondary graphic projection device and the controller.

According to another aspect, the controller is further adapted to save the identified interaction mode for the external interface, such that the identified interaction mode can be pulled from memory for future visits to the external interface.

According to another aspect, when performing an interaction with the external interface the controller is adapted to at least one of display, with the video display, an image of identification credentials to the external interface, display, with the video display, an image of at least one of an authentication card, bar code, and QR code for payments, and initiate a vehicle event such as door unlocking, door opening, window lowering, and trunk hatch opening.

According to several aspects of the present disclosure, a method of facilitating interaction between an autonomous vehicle and an external interface in proximity to the autonomous vehicle, includes collecting, with a plurality of external sensors positioned on the autonomous vehicle, data relative to an environment surrounding and in proximity to the autonomous vehicle, receiving, with a controller, data collected by the plurality of external sensors, identifying, with the controller, an interaction mode for the external interface, facilitating, with a wireless communication module, wireless data exchange between the controller and remote entities, facilitating, with a microphone and a speaker, audible communication between the controller and the external interface, displaying, with a video display, visual information to the external interface, and performing, with the controller, an interaction with the external interface.

According to another aspect, the performing, with the controller, an interaction with the external interface is done automatically.

According to another aspect, the method further includes initiating, with the controller, a telepresence mode when one of an interaction mode cannot be identified, and an identified interaction mode requires telepresence.

According to another aspect, the method further includes, when in telepresence mode, facilitating, with the controller, communication between one of a remotely located owner of the autonomous vehicle, a remotely located agent acting on behalf of the owner of the autonomous vehicle, and an artificial intelligence agent, and displaying, with the video display, one of a video image of the remotely located owner, a video image of the remotely located agent, and a video image of an avatar, and enabling, with the controller, a remotely located person to trigger a vehicle event.

According to another aspect, triggering a vehicle event includes triggering one of door unlocking, door opening, window lowering, and trunk hatch opening.

According to another aspect, the external interface is one on a person and a human machine interface.

According to another aspect, the displaying, with a video display, visual information to the external interface, further includes displaying, with the video display, visual information within a window of the autonomous vehicle that is visible to the external interface and to occupants within the autonomous vehicle.

According to another aspect, the video display includes a transparent substrate, having light emitting particles dispersed therein, positioned on the window of the autonomous vehicle, a primary graphic projection device for generating a first set of images upon the window based on visible light, a secondary graphic projection device for generating a second set of images upon a secondary area the window of the vehicle based on an excitation light, a primary graphics processing unit in electronic communication with the primary graphic projection device and the controller, and a secondary graphics processing unit in electronic communication with the secondary graphic projection device and the controller.

According to another aspect, the method further includes, saving, with the controller, the identified interaction mode for the external interface, such that the interaction mode can be pulled from memory for future visits to the external interface.

According to another aspect, the performing, with the controller, an interaction with the external interface further includes at least one of displaying, with the video display, an image of identification credentials to the external interface, displaying, with the video display, an image of at least one of an authentication card, bar code, and QR code for payments, and initiating a vehicle event such as door unlocking, door opening, window lowering, and trunk hatch opening.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
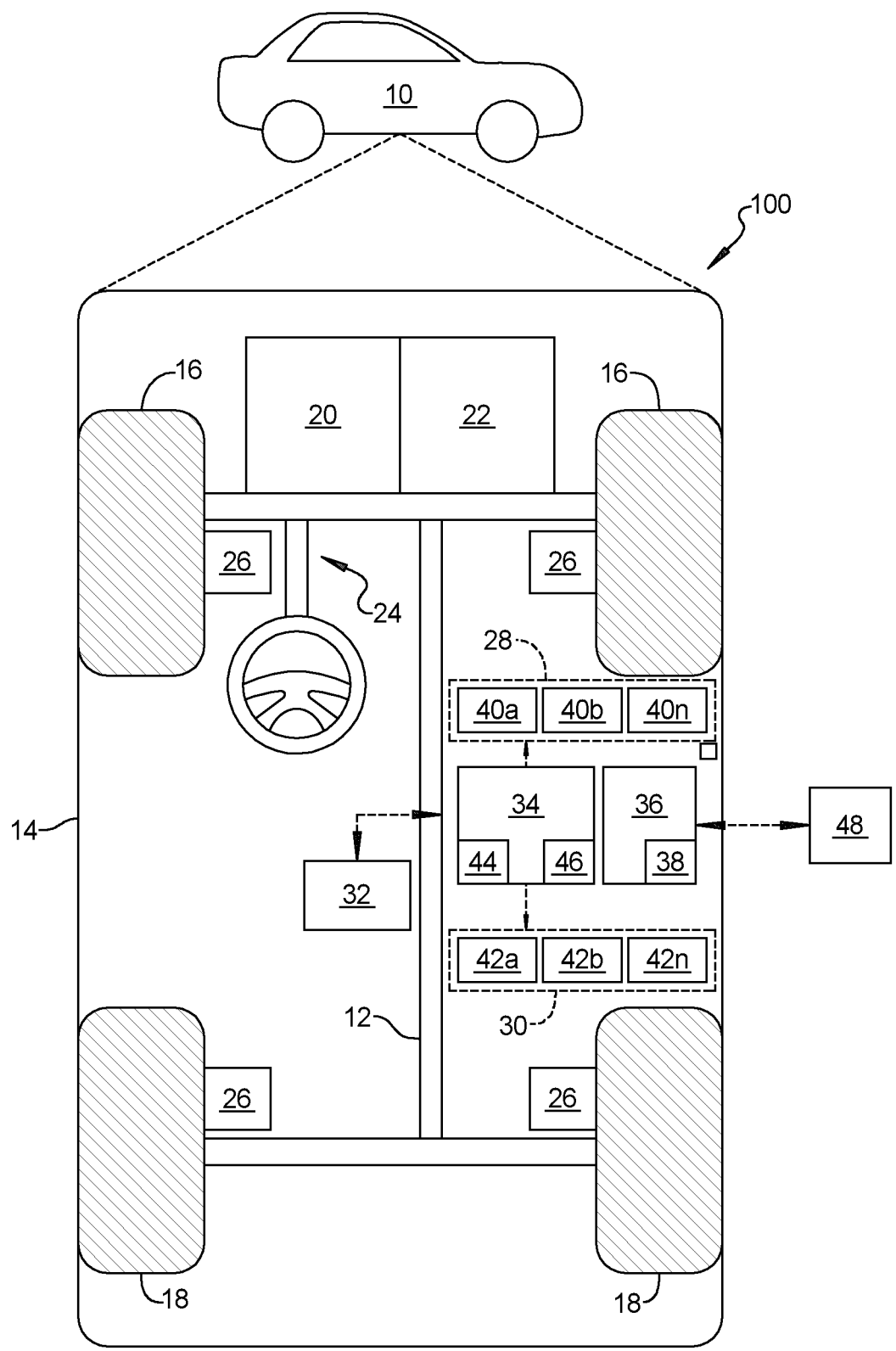
FIG. 1 is a schematic diagram of an autonomous vehicle including a system according to an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

In accordance with an exemplary embodiment, FIG. 1 shows a vehicle 10 with an associated system 11 for facilitating interaction between the vehicle 10 and an external interface 50. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The front wheels 16 and rear wheels 18 are each rotationally coupled to the chassis 12 near a respective corner of the body 14.

In various embodiments, the vehicle 10 is an autonomous vehicle and the system is incorporated into the autonomous vehicle 10 (hereinafter referred to as the autonomous vehicle 10). The autonomous vehicle 10 is, for example, a vehicle that is automatically controlled to carry passengers from one location to another, or to perform tasks with no passengers present. The autonomous vehicle 10 is depicted in the illustrated embodiment as a passenger car, but it should be appreciated that any other vehicle including motorcycles, trucks, sport utility vehicles (SUVs), recreational vehicles (RVs), etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, a controller 34, and a communication system 36. In an embodiment in which the autonomous vehicle 10 is an electric vehicle, there may be no transmission system 22. The propulsion system 20 may, in various embodiments, include an internal combustion engine, an electric machine such as a traction motor, and/or a fuel cell propulsion system. The transmission system 22 is configured to transmit power from the propulsion system 20 to the vehicle's front wheels 16 and rear wheels 18 according to selectable speed ratios. According to various embodiments, the transmission system 22 may include a step-ratio automatic transmission, a continuously-variable transmission, or other appropriate transmission. The brake system 26 is configured to provide braking torque to the vehicle's front wheels 16 and rear wheels 18. The brake system 26 may, in various embodiments, include friction brakes, brake by wire, a regenerative braking system such as an electric machine, and/or other appropriate braking systems. The steering system 24 influences a position of the front wheels 16 and rear wheels 18. While depicted as including a steering wheel for illustrative purposes, in some embodiments contemplated within the scope of the present disclosure, the steering system 24 may not include a steering wheel.

The sensor system 28 includes one or more external sensors 40a-40n that sense observable conditions of the exterior environment and/or the interior environment of the autonomous vehicle 10. The external sensors 40a-40n can include, but are not limited to, radars, lidars, global positioning systems, optical cameras, thermal cameras, ultrasonic sensors, and/or other sensors. The external sensors 40a-40n are adapted to collect data relative to an environment surrounding the autonomous vehicle 10 as well as external interfaces 50 within proximity of the autonomous vehicle 10. The cameras can include two or more digital cameras spaced at a selected distance from each other, in which the two or more digital cameras are used to obtain stereoscopic images of the surrounding environment in order to obtain a three-dimensional image. The sensing devices 40a-40n can include sensors that monitor dynamic variables of the vehicle, such as its velocity, its acceleration, a number of times that the brake is applied, etc. The actuator system 30 includes one or more actuator devices 42a-42n that control one or more vehicle features such as, but not limited to, the propulsion system 20, the transmission system 22, the steering system 24, and the brake system 26.

The controller 34 includes at least one processor 44 and a computer readable storage device or media 46. The at least one processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macro-processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the at least one processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the at least one processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller is shown in FIG. 1, embodiments of the autonomous vehicle 10 can include any number of controllers that communicate over any suitable communication medium or a combination of communication mediums and that cooperate to process the sensor signals, perform logic, calculations, methods, and/or algorithms, and generate control signals to automatically control features of the autonomous vehicle 10.

The communication system 36 includes a wireless communication module 38 that is configured to wirelessly communicate information and data to and from other remote entities 48, such as but not limited to, other vehicles ("V2V" communication) infrastructure ("V2I" communication), remote systems, remote servers, cloud computers, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
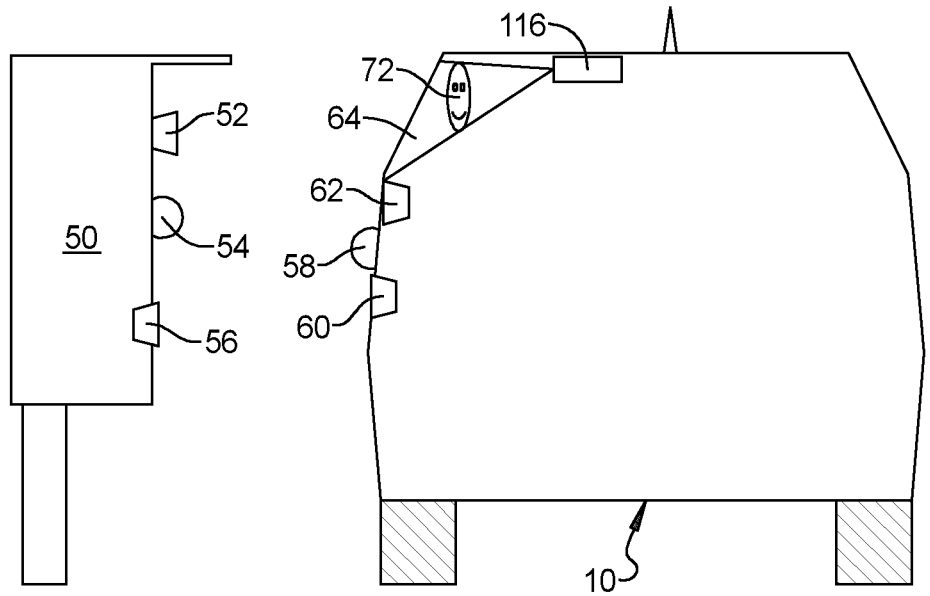
FIG. 2 is a schematic rear view of an autonomous vehicle adjacent an external interface.

The system allows the autonomous vehicle 10 to interact with the physical environment surrounding the autonomous vehicle 10, including, specifically, external interfaces 50, allowing the autonomous vehicle 10 to perform interactions with the external interfaces 50. For example, the system 11 will allow the autonomous vehicle 10 to interact with a security guard or an automated human machine interface (HMI), pick up groceries or packages from a store or restaurant, interact with a law enforcement officer, or verify or correct passengers that are embarking/disembarking the autonomous vehicle 10. As shown in FIG. 2, the autonomous vehicle 10 has pulled up to an external interface 50 that includes a camera 52, microphone 54 and speaker 56. Similarly to how the controller 34 within the autonomous vehicle 10 identifies the external interface 50, the external interface 50 uses the camera 52 to identify the autonomous vehicle 10. The autonomous vehicle 10 includes a microphone 58 and speaker 60, which, along with the microphone 54 and speaker 56 of the external interface 50 allow audible communication between the autonomous vehicle 10 and the external interface 50.

In an exemplary embodiment, the controller 34 is adapted to receive data collected by the plurality of external sensors

40a-40n, to identify an interaction mode for the external interface 50, and to perform an interaction with the external interface 50. Referring again to FIG. 2, in order to facilitate the identification of an interaction mode and performance of an interaction with the external interface 50, the system 11 uses the microphone 58 and the speaker 60 of the autonomous vehicle 10 to facilitate audible communication between the controller 34 and the external interface 50, a camera 62 to collect images of the external interface 50, and a video display 64 adapted to display visual information to the external interface 50.

The interaction mode defines what actions are necessary. For example, as shown in FIG. 2, once the autonomous vehicle 10 approaches the external interface 50, the controller 34, using the camera 62 and microphone 58, determines what kind of interaction is necessary. The external interface 50 may display instructions that are readable by the camera 62, or may provide audible instructions that are received by the microphone 58. The controller 34 will determine an appropriate interaction mode based on input from the external interface 50, via the camera 62 and microphone 58. The controller 34 uses a neural network based computer-vision algorithm to analyze images captured by the camera 62 to identify the nature of the external interface and to determine an appropriate interaction mode.

For instance, the camera 62 on the autonomous vehicle 10 may collect instructions that are printed on the external interface 50 or may be displayed on a video monitor of the external interface 50. In one example, such instructions may instruct the autonomous vehicle 10 to provide an access code, wherein the controller 34 identifies the appropriate interaction mode (providing the access code), and provides the access code via the speaker 60, which is received by the external interface 50, via the microphone 54. In another example, such instructions may instruct the autonomous vehicle 10 to present, via the video display 64, identification credentials 66, such as a badge, authentication card, bar code, QR code or driver's license, wherein the controller 34 identifies the appropriate interaction mode (displaying identification credentials 66), and displays the identification credentials 66 on the video display 64.

In another example, the appropriate interaction mode may include initiating a vehicle event, such as door unlocking, door opening, window lowering or truck hatch opening. For example, if the autonomous vehicle 10 is located at a pick-up location for packages or food, the controller 34 may determine that a part of the appropriate interaction mode includes opening a door of the autonomous vehicle 10 to allow food or packages to be placed within the autonomous vehicle 10. In an exemplary embodiment, the controller 34 is adapted to save an identified interaction mode for a particular external interface 50, thus, allowing the controller 34 to pull the appropriate interaction mode from memory when the autonomous vehicle 10 visits that particular external interface 50 in the future.

In an exemplary embodiment, the system 11 is able to operate within a fully automatic mode, wherein the interaction with an external interface 50 is identified, interpreted, and carried out by the system 11 within the autonomous vehicle 10 with no direct participation by a human. Further, the system 11 can, when needed, operate in a telepresence mode. In an exemplary embodiment, the controller 34 is further adapted to initiate a telepresence mode when an interaction mode cannot be identified, or when an identified interaction mode requires telepresence. When in telepresence mode, the controller 34 is adapted to facilitate communication between one of: 1) a remotely located owner 68 of the autonomous vehicle 10, 2) a remotely located agent 70 acting on behalf of the owner 68 of the autonomous vehicle 10, and 3) an artificial intelligence agent.

Communications while in telepresence mode are carried out by the wireless communication module 38 within the controller 34. An owner 68 of the autonomous vehicle 10 may be contacted through wireless communication between the controller 34 and a personal device such as a cell phone, tablet or computer, allowing the remotely located owner 68 of the autonomous vehicle 10 to communicate directly with the external interface 50 via the microphone 58 and speaker 60. Similarly, in certain circumstances, communication may be necessary between the external interface 50 and a remotely located agent 70, such as an OnStar agent. In certain circumstances it may be necessary for the controller 34 to obtain additional information, such as when trying to determine an appropriate interaction mode. In an exemplary embodiment, the controller 34 includes an artificial intelligence algorithm adapted to prompt the external interface 50 for additional information needed to determine an appropriate interaction mode and what interaction should be performed.

In an exemplary embodiment, the controller 34 is further adapted to display, with the video display 64, a video image 72 that is one of 1) a video image of the remotely located owner 68, 2) a video image of the remotely located agent 70, and 3) a video image of an avatar. Thus, when the remotely located owner 68 of the autonomous vehicle 10 or the remotely located agent 70 has a device with two-way video capability, the controller 34 can present a video image 72 of the remotely located owner 68 or the remotely located agent 70 to the external interface 50 (human or HMI) via the video display 64 to allow more personalized communication, and allowing the external interface 50 to visually verify the identification of the remotely located owner/agent 68, 70. The controller 34, when facilitating communication between the external interface 50 and an artificial intelligence algorithm within the controller 34, may display a video image 72 of an avatar on the video display 64 for the external interface 50. The avatar may be a realistic representation of the remotely located human (owner 68 or agent 70), or may be a caricature of the remotely located human or may simply be an avatar of a face or even just a smiley face to provide an image for interaction with the external interface 50.

In an exemplary embodiment, when in telepresence mode, the controller 34 is adapted to enable a remotely located person to trigger a vehicle event. For instance, while interacting with an external interface, an owner 68 of the autonomous vehicle 10 can use an application on a personal device such as a cell phone, tablet or computer to unlock a door of the autonomous vehicle 10 to allow entry/exit of passengers, or to open a truck hatch to allow packages to be placed therein.

Figure 3:
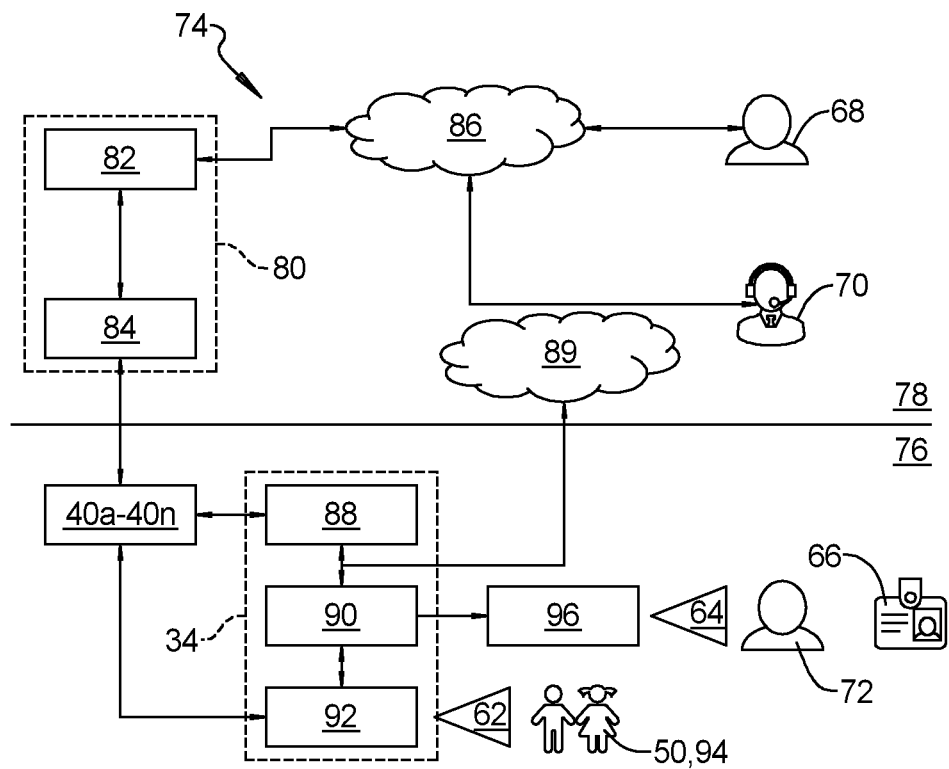
FIG. 3 is a schematic view of an architecture of a system suitable for facilitating interaction between an autonomous vehicle and an external interface according to an exemplary embodiment.

Referring to FIG. 3, a schematic view of an architecture of a system 74 suitable for facilitating interaction between an autonomous vehicle 10 and an external interface 50. The system 74 includes operation within a vehicle domain 76 and a cloud domain 78. The vehicle domain 76 includes the autonomous vehicle 10. The cloud domain 78 includes one or more remote servers 80 including a telepresence engine 82 and context evaluation algorithm 84. Information is sent back and forth between the autonomous vehicle 10 in the vehicle domain 76 and the one or more remote servers 80 in the cloud domain 78.

In the vehicle domain 76, the autonomous vehicle 10 obtains data from the external sensing devices 40a-40n. This data is communicated to the one or more remote servers 80.

In the cloud domain 78, when in telepresence mode, communication is facilitated, via a streaming service 86 with a remotely located human, such as the owner 68 of the autonomous vehicle 10, or an agent 70 representing the owner 68 of the autonomous vehicle 10. In the vehicle domain 76, the controller 34 identifies an interaction mode with a mode selecting algorithm 88 and determines an appropriate interaction with an interaction algorithm 90, and communicates with an automated dialog service 89 in the cloud domain. A perception algorithm 92 collects and interprets images of external interfaces 50 and external actors 94, via the camera 62. The interaction performed by the system 11 is performed, in part, with a rendering algorithm 96 that controls what is displayed on the video display 64, such as video images 72 of a remotely located owner/agent 68, 70, or identification credentials 66.

Figure 4:
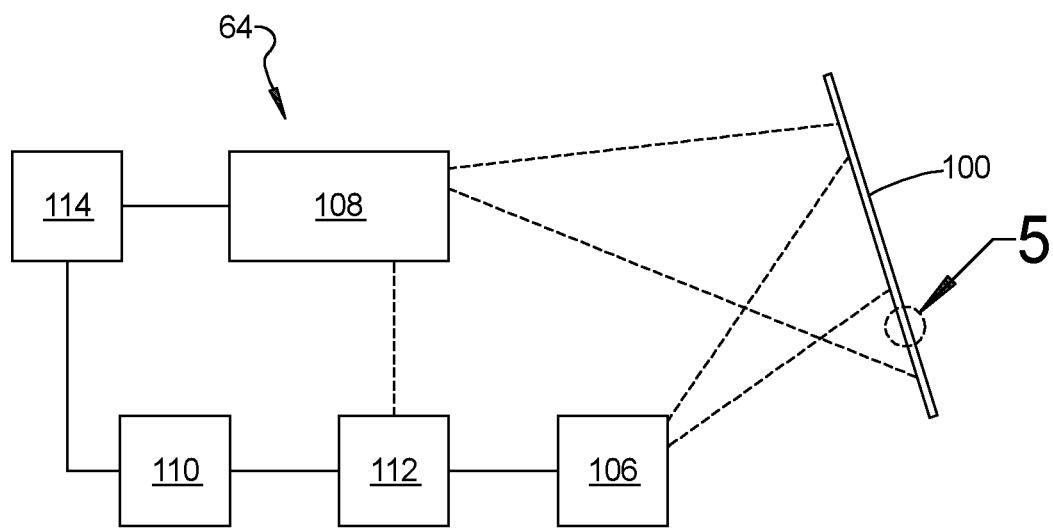
FIG. 4 is a schematic diagram of a video display according to an exemplary embodiment.
Figure 5:
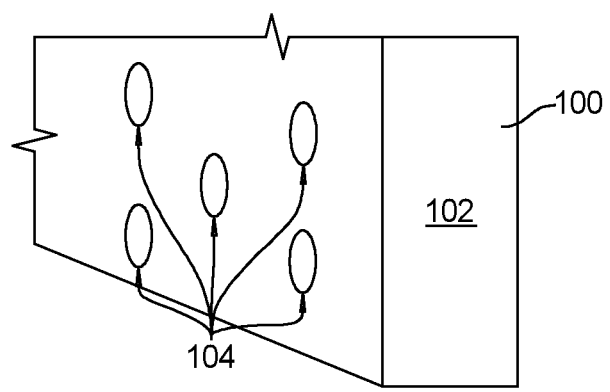
FIG. 5 is an enlarged view of a portion of the window shown in FIG. 4.

The video display 64 may utilize transparent micro-LEDs or transparent organic LEDs (OLEDS). Referring to FIG. 4 and FIG. 5, in an exemplary embodiment, the video display 64 is adapted to present a visual image 72 within a window 100 of the autonomous vehicle 10 that is visible to the external interface 50 and to occupants within the autonomous vehicle 10. The video display 64 includes a transparent substrate 102 affixed to the window 100 within the vehicle compartment and including light emitting particles 104 embedded therein. As explained below, the video display 64 includes a primary graphic projection device 106 and a secondary graphic projection device 108 that work together to provide an image 72 displayed on the window 100 of the autonomous vehicle 10.

The video display 64 includes one or more controllers 110 in electronic communication with the controller 34, a primary graphics processing unit 112 corresponding to the primary graphic projection device 106, and a secondary graphics processing unit 114 corresponding to the secondary graphic projection device 108. The primary graphics processing unit 112, the primary graphic projection device 106, the secondary graphics processing unit 114, and the secondary graphic projection device 108 are housed within a projection module 116 mounted within the autonomous vehicle 10.

When excitation light is absorbed by the light emitting particles 104, visible light is generated by the light emitting particles 104. In an embodiment, the light emitting particles 104 are red, green, and blue (RGB) phosphors for full color operation, however, it is to be appreciated that monochrome or a two-color phosphor may be used as well. In an exemplary embodiment, the primary graphic projection device 106 and the secondary graphic projection device 108 provide ultraviolet light (UV) projections adapted to excite the light emitting particles 104. In other embodiments, not utilizing light emitting particles 104 that depend on excitation, either of the primary graphic projection device 106 and the secondary graphic projection device 108 could project visible light, rather than UV light. The primary graphic projection device 106 generates a first set of images upon a primary area of the window 100 based on visible light, and the secondary graphic projection device 108 generates a second set of images upon a secondary area the window 100 based on an excitation light. Specifically, the light emitting particles 104 dispersed within the transparent substrate 102 emit visible light in response to absorbing the excitation light emitted by the secondary graphic projection device 108. The first set of images cooperate with the second set of images to create an edge-to-edge display on the window 100. The primary graphic projection device 106 includes a visible light source configured to generate the first set of images upon the window 100. The visible light source may be, for example, a laser or light emitting diodes (LEDs).

Figure 6:
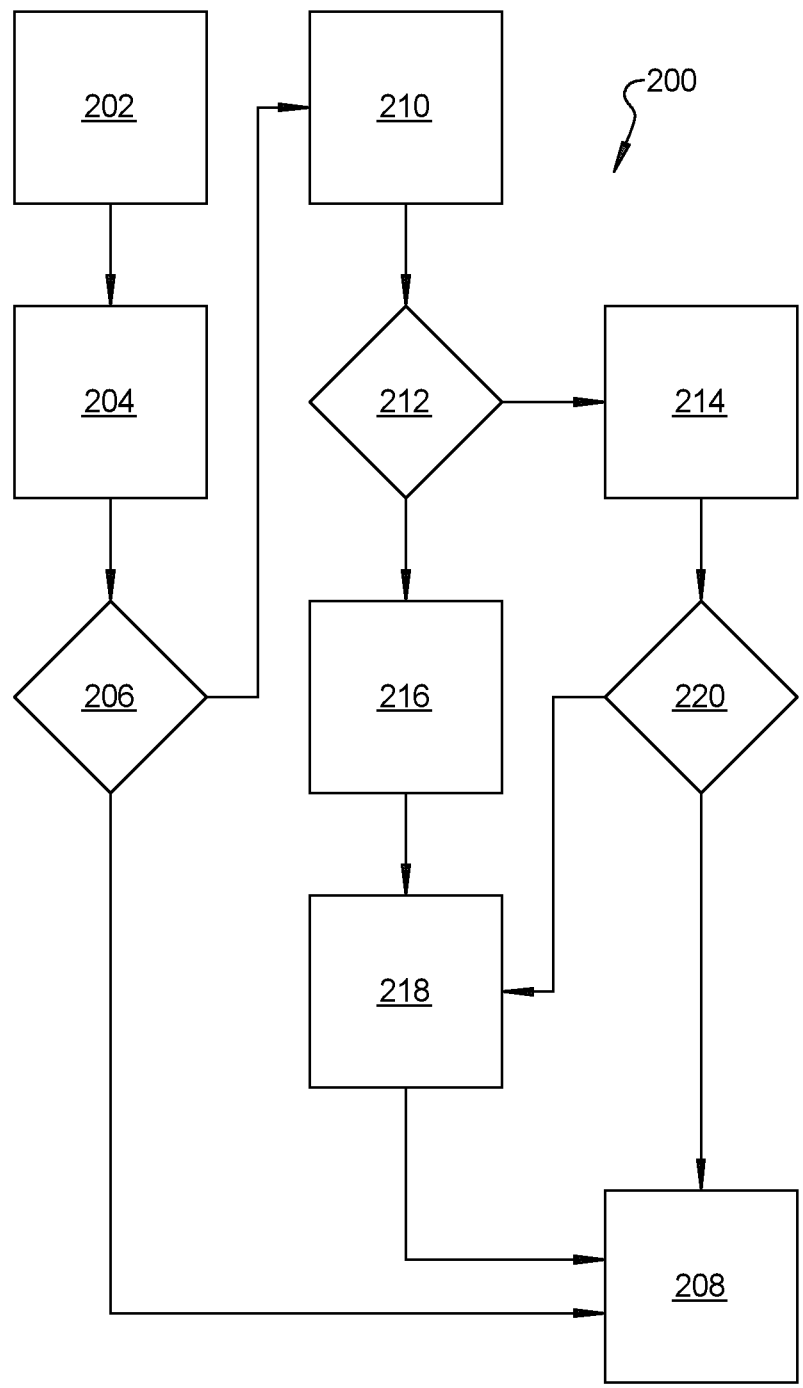
FIG. 6 is a flow chart illustrating a method according to an exemplary embodiment of the present disclosure.

Referring to FIG. 6, a method 200 of facilitating interaction between an autonomous vehicle 10 and an external interface 50 in proximity to the autonomous vehicle 10 includes, when an autonomous vehicle 10 arrives at an external interface 50, at block 202, and moving to block 204, collecting, with a plurality of external sensors 40a-40n positioned on the autonomous vehicle 10, data relative to an environment surrounding and in proximity to the autonomous vehicle 10, and receiving, with a controller 34, data collected by the plurality of external sensors 40a-40n. For instance, if the vehicle 10 routinely goes to the same secured parking lot, and has previously successfully used a particular form of interaction at the security gate, the controller 34 may record details of the successful interaction including the location coordinates (precise latitude and longitude, or similar coordinates), the form of interaction successfully used, and a class of interaction (e.g. presenting credentials, providing access to enter the vehicle, providing access for object(s) to be placed in the vehicle, etc.). Some forms of interaction may not be recorded if not expected to be repeated, such as interaction with law enforcement. Thus, at block 104, the controller 34 can use GPS and other location data collected by sensors 40a-40n to match a current location with recorded instances of past successful interactions at the current location. This would not provide a definitive determination of what the appropriate interaction may be, but would help resolve ambiguity (e.g. conflicting perception results) and improve consistency of behavior. When visiting the same location on later trips, the system can be "primed" to expect to use the same forms of interaction and can confidently use them unless the particulars of the trip/mission are significantly different or the scene appears to be altered compared to prior successful interactions. For instance, the controller 34 can also trigger help manual "telepresence" when something about the scene is very different than past visits (e.g. a new security interface is installed that is different than the prior one) and it is therefore prudent to have a live human help determine the appropriate form of interaction.

Moving to block 206, if the controller 34 recognizes the external interface 50, then, moving to block 208, the controller 34 is adapted to perform an appropriate interaction with the external interface 50, wherein the controller 34 pulls the appropriate interaction mode from memory, as discussed above.

Moving to block 206, if the controller 34 does not recognize the external interface 50, then, moving to block 210, the method 200 includes, identifying, with the controller 34, using a neural network based computed vision algorithm, an interaction mode for the external interface 50, including facilitating, with a wireless communication module 38, wireless data exchange between the controller 34 and remote entities 48, facilitating, with a microphone 58 and a speaker 60, audible communication between the controller 34 and the external interface 50, and displaying, with a video display 64, visual information within a window 100 of the autonomous vehicle 10 that is visible to the external interface 50 and to occupants within the autonomous vehicle 10.

Moving from block 210 to block 212, if an interaction mode is identified by the controller 34, moving to block 214, the method 200 includes using, with the controller 34, the neural network based computer vision algorithm, identifying the appropriate interaction to perform, and saving, with the controller 34, the identified interaction mode for the external interface 50, such that the interaction mode can be pulled from memory for future visits to the external interface 50.

Moving from block 210 to block 212, if an interaction mode is not identified by the controller 34, moving to block 216, the controller 34 initiates a telepresence mode. Moving to block 218, when in telepresence mode, the method 200 includes facilitating, with the controller 34, communication between one of 1) a remotely located owner 68 of the autonomous vehicle 10, 2) a remotely located agent 70 acting on behalf of the owner 68 of the autonomous vehicle 10, and 3) an artificial intelligence agent, and displaying, with the video display 64, one of 1) a video image 72 of the remotely located owner 68, 2) a video image 72 of the remotely located agent 70, and 3) a video image 72 of an avatar, and enabling, with the controller 34, a remotely located person to trigger a vehicle event. Moving to block 108, the method 200 includes performing an appropriate interaction with the external interface 50.

Moving from block 214 to block 220, if the controller 34 identifies an appropriate interaction mode and interaction to perform, then, moving to block 108, the controller 34 automatically performs the interaction between the autonomous vehicle 10 and the external interface 50.

Moving from block 214 to block 220, if the controller 34 is unable to identify an appropriate interaction mode and interaction to perform, or if the interaction mode requires direct human interaction, then, moving from block 220 to block 218, in telepresence mode, the method 200 includes facilitating, with the controller 34, communication between one of 1) a remotely located owner 68 of the autonomous vehicle 10, 2) a remotely located agent 70 acting on behalf of the owner 68 of the autonomous vehicle 10, and 3) an artificial intelligence agent, and displaying, with the video display 64, one of 1) a video image 72 of the remotely located owner 68, 2) a video image 72 of the remotely located agent 70, and 3) a video image 72 of an avatar, and enabling, with the controller 34, a remotely located person to trigger a vehicle event. Moving to block 208, the method 200 includes performing an appropriate interaction with the external interface 50.

In an exemplary embodiment, the performing an appropriate interaction with the external interface 50, at block 208, further includes at least one of 1) displaying, with the video display 64, a video image 72 of identification credentials 66 to the external interface 50, 2) displaying, with the video display 64, a video image 72 of at least one of an authentication card, bar code, and QR code for payments, and 3) initiating a vehicle event such as door unlocking, door opening, window lowering, and trunk hatch opening.

A system and method of the present disclosure offers the advantage of enabling an autonomous vehicle to automatically identify an external interface and determine an appropriate interaction mode, and to perform an appropriate interaction with the external interface. Where necessary, a telepresence mode allows the system to engage a human presence to identify an appropriate interaction mode and/or to perform an interaction.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for facilitating interaction between an autonomous vehicle and an external interface, comprising:
   a plurality of external sensors positioned on the autonomous vehicle that collect data relative to an environment surrounding the autonomous vehicle;
   a control processor having a wireless communication circuit;
   the wireless communication circuit enabling wireless data exchange between the control processor and remote entities;
   the control processor receiving data collected from the plurality of external sensors and, using a neural network based computer-vision algorithm stored therein, identify an interaction mode of the external interface;
   a microphone and a speaker enabling audible communication between the control processor and the external interface; and
   a video display displaying visual information to the external interface;
   wherein, the control processor performs an interaction with the external interface;
   wherein the video display presents a visual display within a window of the autonomous vehicle that is visible to the external interface and to occupants within the autonomous vehicle; and
   wherein the video display includes:
      a transparent substrate, having light emitting phosphor particles dispersed therein, positioned on the window of the autonomous vehicle;
      a primary graphic projector generating a first set of images upon the window based on visible light;
      a secondary graphic projector projecting ultraviolet light that excites the light emitting phosphor particles and generating a second set of images upon a secondary area the window of the vehicle based on an excitation light;
      a primary graphics processing unit in electronic communication with the primary graphic projector and the control processor; and
      a secondary graphics processing unit in electronic communication with the secondary graphic projector and the control projector.

2. The system of claim 1, wherein the interaction performed by the control processor is fully automatic.

3. The system of claim 1, wherein the control processor initiates a telepresence mode when one of:
   an interaction mode cannot be identified; and
   an identified interaction mode requires telepresence.

4. The system of claim 3, wherein when in telepresence mode the control processor is configured to:
   facilitate communication with one of:
      a remotely located owner of the autonomous vehicle;
      a remotely located agent acting on behalf of the owner of the autonomous vehicle; and
      an artificial intelligence agent; and
   display, with the video display, one of:
      a video image of the remotely located owner;
      a video image of the remotely located agent; and
      a video image of an avatar; and
   enable a remotely located person to trigger a vehicle event.

5. The system of claim 1, wherein the external interface is one of a person and a human machine interface.

6. The system of claim 1, wherein the control processor saves the identified interaction mode of the external interface, such that the identified interaction mode can be pulled from memory for future visits to the external interface.

7. The system of claim 1, wherein when performing an interaction with the external interface the control processor is configured to at least one of:
- display, with the video display, an image of identification credentials to the external interface;
- display, with the video display, an image of at least one of an authentication card, bar code, and QR code; and
- initiate a vehicle event such as door unlocking, door opening, window lowering, and trunk hatch opening.

8. A method of facilitating interaction between an autonomous vehicle and an external interface in proximity to the autonomous vehicle, comprising:
- collecting, with a plurality of external sensors positioned on the autonomous vehicle, data relative to an environment surrounding and in proximity to the autonomous vehicle;
- receiving, with a control processor, data collected by the plurality of external sensors;
- identifying, with the control processor, using a neural network based computer-vision algorithm stored therein, an interaction mode of the external interface;
- facilitating, with a wireless communication circuit, wireless data exchange between the control processor and remote entities;
- facilitating, with a microphone and a speaker, audible communication between the control processor and the external interface;
- displaying, with a video display, visual information to the external interface; and
- performing, with the control processor, an interaction with the external interface;
- wherein the displaying, with a video display, visual information to the external interface, further includes displaying, with the video display, visual information within a window of the autonomous vehicle that is visible to the external interface and to occupants within the autonomous vehicle; and
- wherein the video display includes:
  - a transparent substrate, having light emitting phosphor particles dispersed therein, positioned on the window of the autonomous vehicle;
  - a primary graphic projector generating a first set of images upon the window based on visible light;
  - a secondary graphic projector projecting ultraviolet light that excites the light emitting phosphor particles generating a second set of images upon a secondary area the window of the vehicle based on an excitation light;
  - a primary graphics processing unit in electronic communication with the primary graphic projector and the control processor; and
  - a secondary graphics processing unit in electronic communication with the secondary graphic projector and the control processor.

9. The method of claim 8, wherein the performing, with the control processor, an interaction with the external interface is done automatically.

10. The method of claim 8, further including initiating, with the control processor, a telepresence mode when one of:
- an interaction mode cannot be identified; and
- an identified interaction mode requires telepresence.

11. The method of claim 10, further including, when in telepresence mode, facilitating, with the control processor, communication with between one of:
- a remotely located owner of the autonomous vehicle;
- a remotely located agent acting on behalf of the owner of the autonomous vehicle; and
- an artificial intelligence agent; and displaying, with the video display, one of:
- a video image of the remotely located owner;
- a video image of the remotely located agent; and
- a video image of an avatar; and
- enabling, with the control processor, a remotely located person to trigger a vehicle event.

12. The method of claim 11, wherein triggering a vehicle event includes triggering one of:
- door unlocking, door opening, window lowering, and trunk hatch opening.

13. The method of claim 8, wherein the external interface is one of a person and a human machine interface.

14. The method of claim 8, further including, saving, with the control processor, the identified interaction mode of the external interface, such that the interaction mode can be pulled from memory for future visits to the external interface.

15. The method of claim 8, wherein the performing, with the control processor, an interaction with the external interface further includes at least one of:
- displaying, with the video display, an image of identification credentials to the external interface;
- displaying, with the video display, an image of at least one of an authentication card, bar code, and QR code for payments; and
- initiating a vehicle event such as door unlocking, door opening, window lowering, and trunk hatch opening.

16. A system for facilitating interaction between an autonomous vehicle and an external interface, that is one of a person and a human machine interface, in proximity to the autonomous vehicle, comprising:
- a plurality of external sensors positioned on the autonomous vehicle and that collects data relative to an environment surrounding and in proximity to the autonomous vehicle;
- a control processor having a wireless communication circuit;
- the wireless communication circuit facilitating wireless data exchange between the control processor and remote entities;
- the control processor receiving data collected from the plurality of external sensors, identify, using a neural network based computer-vision algorithm stored therein, an interaction mode of the external interface, and save the identified interaction mode of the external interface, such that the interaction mode can be pulled from memory for future visits to the external interface;
- a microphone and a speaker facilitating audible communication between the control processor and the external interface; and
- a video display displaying visual information within a window of the autonomous vehicle that is visible to the external interface and to occupants within the autonomous vehicle, the video display including:
  - a transparent substrate, having light emitting phosphor particles dispersed therein, positioned on the window of the autonomous vehicle;
  - a primary graphic projector generating a first set of images upon the window based on visible light;
  - a secondary graphic projector projecting ultraviolet light that excites the light emitting phosphor particles generating a second set of images upon a secondary area the window of the vehicle based on an excitation light;
  - a primary graphics processing unit in electronic communication with the primary graphic projector and the control processor; and a secondary graphics processing unit in electronic communication with the secondary graphic projector and the control processor;
wherein, the control processor is configured to one of:
automatically perform an interaction with the external interface; and
initiate a telepresence mode when one of an interaction mode cannot be identified, and an identified interaction mode requires telepresence;
wherein, when in telepresence mode the control processor is intended to:
facilitate communication with between one of:
a remotely located owner of the autonomous vehicle;
a remotely located agent acting on behalf of the owner of the autonomous vehicle; and
an artificial intelligence agent; and
display, with the video display, one of:
a video image of the remotely located owner;
a video image of the remotely located agent; and
a video image of an avatar; and
enable a remotely located person to trigger a vehicle event;
wherein, when performing an interaction with the external interface the control processor is configured to at least one of:
display, with the video display, an image of identification credentials to the external interface;
display, with the video display, an image of at least one of an authentication card, bar code, and QR code for payments; and
initiate a vehicle event such as door unlocking, door opening, window lowering, and trunk hatch opening.

* * * * *